US005237501A

United States Patent [19]

Gusakov

[11] Patent Number: 5,237,501

[45] Date of Patent: Aug. 17, 1993

[54] ACTIVE MECHANICAL PATIENT SUPPORT SYSTEM

[75] Inventor: Ignaty Gusakov, 1361 Underhill Rd., East Aurora, N.Y. 14052

[73] Assignee: Ignaty Gusakov, East Aurora, N.Y.

[21] Appl. No.: 572,555

[22] Filed: Aug. 27, 1990

[51] Int. Cl.[5] .............................................. G06F 15/00

[52] U.S. Cl. .............................................. 364/413.01

[58] Field of Search ...................... 364/413.01, 413.02, 364/413.04

[56] References Cited

U.S. PATENT DOCUMENTS

| | | | |
|---|---|---|---|
| 2,391,746 | 12/1945 | Schenker | 5/60 |
| 2,445,158 | 7/1948 | Sparhawk | 5/60 |
| 2,773,498 | 12/1956 | Himmelman | 128/33 |
| 3,298,363 | 1/1967 | Parkin | 128/33 |
| 3,340,548 | 9/1967 | Janapol | 5/464 |
| 3,551,924 | 5/1969 | Frye, Sr. | 5/345 |
| 3,656,190 | 4/1972 | Regan et al. | 5/60 |
| 3,879,776 | 4/1975 | Solen | 5/350 |
| 3,999,234 | 12/1976 | Regan | 5/351 |
| 4,279,044 | 7/1981 | Douglas | 5/453 |
| 4,605,582 | 8/1986 | Sias et al. | 5/464 |
| 4,673,605 | 6/1987 | Sias et al. | 5/464 |
| 4,799,276 | 1/1989 | Kadish | 5/446 |
| 4,864,671 | 9/1989 | Evans | 5/453 |
| 4,890,235 | 12/1989 | Reger et al. | 364/468 |

OTHER PUBLICATIONS

RESNA 12th Annual Conference—pp. 234–235.

*Primary Examiner*—Roy N. Envall, Jr.
*Assistant Examiner*—Ari M. Bai
*Attorney, Agent, or Firm*—Young & Thompson

[57] ABSTRACT

A mechanical flotation system to support a body upon a bed, chair and the like which includes a plurality of active support pads which contact various portions of the body to provide such support. Each support pad is connected to an actuator rod which selectively reciprocates in response to an actuator rod displacement control signal and a body contact pressure control signal.

22 Claims, 3 Drawing Sheets

ACTIVE MECHANICAL PATIENT SUPPORT SYSTEM

BACKGROUND OF THE INVENTION

1. Field of the Invention

The present invention relates to an active mechanical support system which is useful in supporting a body by means of a plurality of support pads each of which is connected to an actuator which includes an actuator cylinder and an actuator rod. The support pads are connected to the actuator rod and displaced relative to the actuator cylinder to selectively raise and lower portions of the body in response to actuator displacement control signals and support pad body contact pressure signals.

2. Description of the Prior Art

Human patients who are at risk of developing pressure ulcers (bed sores) are currently placed on foam cushions, air cushions, low air loss beds or beds that have fluidized beads to provide low values of tissue interface pressure. Since tissue interface pressure is a major contributor to pressure ulcers, it is desirable to reduce forces at the surface of tissue to the lowest values possible in treating and preventing pressure ulcers. Each such prior art device reduces tissue interface pressure to varying degrees. However, foam products generally are not able to reduce tissue interface pressure below 32 mm Hg., the capillary closure pressure in humans, on prominent bony areas like the greater trochanter. Air cushion products can reduce interface pressure normal to the surface to values below 32 mm Hg. but under certain use conditions can develop higher interface pressures when surface material is under tension. This condition can be produced by shear forces or when material is stretched by the anatomy to form a hammock-like structure. Low air loss beds are prone to similar deviations from ideal performance. Beds with fluidized beads provide good flotation but it is difficult to support the whole patient on them without external props which in turn cause a loss of flotation effectiveness in places where props are used.

Various controlled cushion-type devices are known. For example, U.S. Pat. No. 4,864,671 to Evans relates to a controllably inflatable cushion including a plurality of independently inflatable rows or zones of cushions which are inflated/deflated by means of a pump and valves which are controlled by a microprocessor control means which receives input from a pressure sensor and input switches. The switches allow the user to set desired inflation sequences and the pressure sensor provides feedback signals to control inflation pressure. The cushions are formed of a plurality of cells which contract and expand in an accordian fashion.

U.S. Pat. No. 4,799,276 to Kadish relates to a body rest including a matrix of freely displaceable supports in the form of free floating, pressurized air-supported pistons which collectively form a couch surface of a bed. Pressure exerted by the patient against each respective piston is constantly measured. The pistons are periodically caused to move downward and then brought back to their initial high level. The pistons include a stem and a head portion. The stem reciprocates in response to hydraulic or pneumatic inflation or deflation of a sleeve as directed by a microprocessor. The head portions each constitute a fraction of a continuous couch surface of the body rest. Capacitive pressure sensors and a scanning system to monitor the pressure conditions prevailing with respect to each support member.

U.S. Pat. No. 3,551,924 to Frye relates to a variable firmness mattress which includes a plurality of vertically movable support rods. Means are provided to vertically vary upward bias of the rods. Each rod includes a flexible head element for universal tilting relative to the rod axis. FIG. 7 depicts the support structure as including a rod, head element with flanged area and a ball and socket arrangement.

U.S. Pat. No. 3,879,776 to Solen relates to a variable tension fluid mattress including a plurality of individual inflatable pads wherein the pressure in various zones can be varied by setting a pressure sensitive switch as desired. In this manner a motor and pump maintain pressure as desired.

U.S. Pat. No. 3,656,190 to Regan et al. describes a plurality of supports with mechanical control for a wave-like motion.

U.S. Pat. No. 4,890,235 to Reger et al. relates to a system for generating a prescription wheelchair or other seating or body arrangement which includes a deformable seat portion. A patient to be fitted is placed upon a seat and thereby generated in response to which the seat surface can be selectively varied by a plurality of pneumatic actuators to provide an updated force distribution signal. In this manner, a preselected force distribution of the patient on the seat is provided. Such data is transmitted to a fabrication unit to allow for fabrication of a permanent seat cushion. A related system is described at pages 234–235 of "RESNA 12th Annual Conference," New Orleans, La. (1989).

Notwithstanding the foregoing teachings, it is desirable to provide a mechanical flotation system which has the ability to reduce body tissue interface pressure normal to the body to its theoretical minimum limit. It is further desirable to provide a mechanical flotation system which relieves shear forces in the plane of the body tissue and support pad interface. It is also desirable to provide a mechanical flotation system which can apply message and wave motion in three dimensions to the patient for comfort enhancement. It is further desirable to provide a mechanical flotation system which is useful in positioning the elevation of the anatomy of the patient similar to gatching of the bed or raising of the head. It is also desirable to provide a mechanical flotation system which is useful in turning or rocking the patient around an axis which extends longitudinally relative to the patient. It is also desirable to provide a mechanical flotation system which facilitates momentarily reducing to zero local body tissue interface pressure in problem locations.

In addition to providing treatment for patients, it is desirable to provide a mechanical flotation system which can be used as a measuring instrument to determine various features of the human anatomy placed upon the supporting surface of the system. Such features include, without limitation, body contours, spring rate or compliance of tissue, extend of joint movement, resistance force of joint rotation, and surface temperature at each contact point. It is further desirable to provide a mechanical flotation system wherein such features can be completely mapped over the extent of the anatomy. It is also desirable to provide a mechanical flotation system useful in diagnostic work and patient condition analysis prior to treatment.

It is also an objective to provide a mechanical flotation system wherein the ratio of a change of force on body tissue to a change of body tissue displacement produces a measure of body tissue stiffness. It is another objective to provide a mechanical flotation system wherein the spring rate of a patient support surface can be adjusted and controlled by varying the ratio of body contact pressure to displacement of body tissue.

SUMMARY OF THE INVENTION

This invention achieves these and other results by providing a mechanical flotation system to support a body including a plurality of support pads which contact various portions of the body to provide such support. The system includes a plurality of actuator members. Each actuator member comprises an actuator connected to a support pad; means connected to the actuator for controlling displacement of the support pad relative to the body in response to a control signal; a first summing means connected to the controlling means for providing a displacement control signal to the controlling means; a second summing means connected to the controlling means for providing a body contact pressure control signal to the controlling means; means connected between the actuator and the first summing means for measuring displacement of the actuator and providing a signal representative of the displacement to the first summing means; and means connected between the actuator and the second summing means for measuring body contact pressure at the support pad and providing a signal representative of the body contact pressure to the second summing means. Means is also provided to the controlling means for displacing the actuator and the support pad relative to the body. Means is provided connected to the first summing means for providing an actuator displacement command signal to the first summing means. In addition, means is provided connected to the second summing means for providing a body contact pressure command signal to the second summing means.

DESCRIPTION OF THE PREFERRED EMBODIMENT

Figure 1:
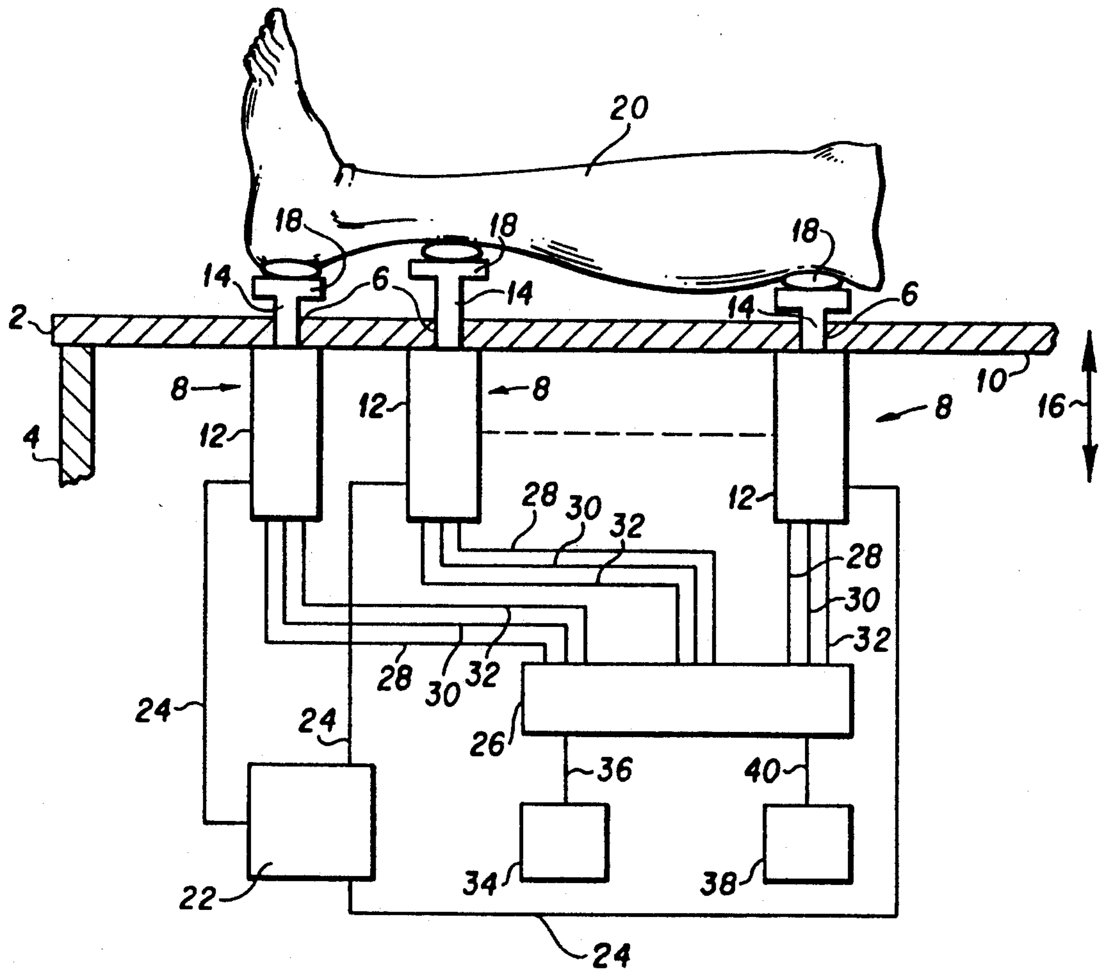
FIG. 1 is a diagrammatic view of one embodiment of the mechanical flotation system of the present invention.
Figure 1A:
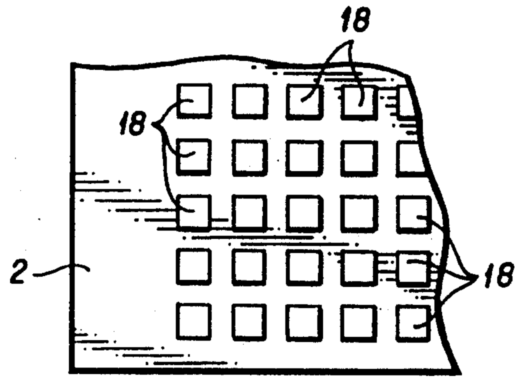
FIG. 1A is a plan view of a portion of the embodiment of FIG. 1 with the patient's body removed.

The embodiment of this invention which is illustrated in the drawings is particularly suited for achieving the objects of this invention. FIG. 1 depicts a mechanical flotation system to support a body including a plurality of support pads which contact various portions of the body to provide such support. The mechanical flotation system includes base 2 supported by legs 4, only one of which is shown, and having a plurality of apertures 6 extending therethrough. A plurality of actuator members 8 are fastened to the underside 10 of the base 2 in a known manner. Each actuator member 8 includes an actuator which is connected to a support pad which contacts a portion of a body to provide variable support for such body. For example, in the preferred embodiment each actuator member includes an actuator in the form of an actuator cylinder 12 having an actuator rod 14 mounted thereto in a known manner for displacement relative to the actuator cylinder 12. In this manner, the actuator and support pad can be displaced relative to the body in the directions of arrow 16. Each actuator rod 14 has a support pad 18 connected to a distal end thereof which extends through a respective aperture 6 for contact with a portion of a body 20. A plurality of actuator members 8 are present to provide an array of support pads 18 throughout the area of the base 2 as depicted in FIG. 1A.

The mechanical flotation system also includes means 22 connected to each actuator member 8 at lines 24 for displacing each actuator rod 14 and the support pad 18 connected thereto relative to body 20 in the directions of arrow 16. In the preferred embodiment, this means is a pneumatic power supply or compressor for use with a pneumatic actuator as described herein. For other known actuating devices this power supply could be electrical, hydraulic or mechanical as required by the particular actuator.

A microprocessor based control system 26 is electrically connected to each actuator member 8 through lines 28, 30, and 32. Microprocessor based control system 26 includes means connected to each actuator member for providing an actuator displacement command signal or input thereto and means connected to each actuator member for providing a body contact pressure command signal or input thereto as described herein. In the preferred embodiment the microprocessor based control system 26 is controlled by a displacement program by means 34 which is electrically connected to the microprocessor based control system through line 36. In a like manner, the microprocessor based control system 26 is also controlled by a body contact pressure program by means 38 which is electrically connected to the microprocessor based control system through line 40. Means 34 and 38 can be, for example, a keyboard, disc, tape, EPROM and the like by means of which each such program can be connected to the microprocessor based control system.

Figure 2:
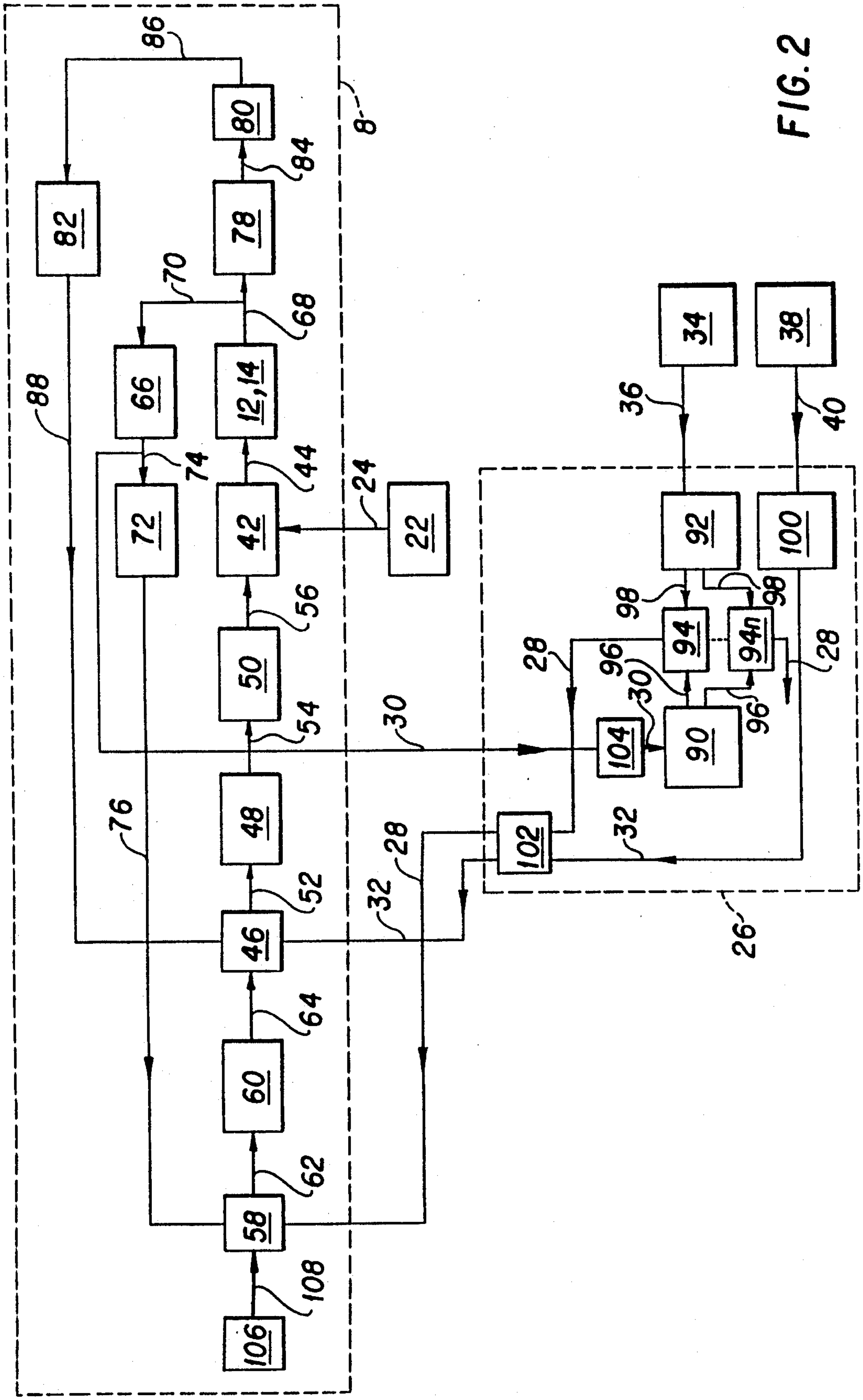
FIG. 2 is a block diagram of the power control and supply system of the embodiment of FIG. 1.

FIG. 2 diagrammatically depicts the mechanical flotation system of FIG. 1. In particular, FIG. 2 depicts the actuator member 8 in block diagram form including the actuator which includes actuator cylinder 12 and actuator rod 14. In a preferred embodiment, as depicted in the drawings, the actuator is a pneumatic type as described herein. However, the present invention is not limited to a pneumatic-type actuator. Other actuators useful in the present invention include, without limitation, hydraulic, electromagnetic, and screw-type actuators.

Actuator member 8 further includes means connected to the actuator for controlling displacement of the actuator, and support pad attached thereto, relative to the body in response to a control signal. In the preferred embodiment such controlling means includes a servovalve 42 connected pneumatically to an input side of actuator 12, 14 by line 44.

Actuator member 8 also includes a summing means 46 connected to the controlling means 42 for providing a body contact pressure control signal to the controlling means. In the preferred embodiment, the summing means 46 is electrically connected to the servovalve 42 through an actuator control amplifier 48 and then a power amplifier 50 by means of lines 52, 54 and 56. In a like manner, another summing means 58 is connected to the controlling means 42 for providing a displacement control signal to the controlling means. In the preferred embodiment, the summing means 58 is electrically connected to the servovalve 42 through a position control amplifier 60 which is connected between the summing means 58 and summing means 46 by lines 62 and 64. In other words, the summing means 58 is connected to the controlling means 42 through position control amplifier 60, summing means 46, actuator control amplifier 48 and then power amplifier 50. The summing means and control amplifier (58 and 60; 46 and 48) functions can be physically separated or combined into one amplifier. The physical device used for these components is an operational amplifier.

Actuator member 8 also includes means connected between the actuator 12, 14 and the summing means 58 for identifying the vertical position of the actuator rod 14, and therefore the position of the support pad 18, by measuring displacement of the actuator rod and providing a signal representative of such displacement to the summing means 58. In the preferred embodiment, such means for measuring displacement includes a displacement transducer 66 which is mechanically connected to the actuator 12, 14 by lines 68 and 70. In the preferred embodiment the displacement transducer is a linear variable differential transformer (LVDT) or linear potentiometer. In the embodiment of FIG. 2, the displacement transducer 66 is connected to summing means 58 through a feedback ratio amplifier 72 whose gain determines the feedback ratio constant. Feedback ratio amplifier 72 is electrically connected to the displacement transducer 66 and summing means 58 by lines 74 and 76. In operation, at the summing means 58, the position feedback signal on line 76 is subtracted from the command signal on line 28 and position bias set point signal on line 108 to be discussed herein.

Actuator member 8 also includes means connected between actuator 12, 14 and summing means 46 for measuring body contact pressure at a support pad 18 and providing a signal representative of such body contact pressure to the summing means 46. In the preferred embodiment, such means for measuring body contact pressure includes a force transducer 78 which is mechanically connected to the actuator 12, 14 by line 68. In the embodiment of FIG. 2, the force transducer 78 is connected electrically to the summing means 46 through a scaling amplifier 80 that multiplies the force signal by the reciprocal of the area of the actuator and then through an operational amplifier 82 whose gain determines the contact pressure feedback ratio by means of lines 84, 86 and 88. In operation, at the summing means 46, the contact pressure feedback signal on line 88 is subtracted from the command signal on line 32 and the position error signal on line 64.

In the preferred embodiment of FIG. 2, the means connected to each actuator member 8 for providing an actuator displacement command signal thereto is in the form of means electrically connected by a respective line 28 to a respective summing means 58 for providing an actuator displacement command signal to each summing means 58. Such means for providing an actuator displacement command signal includes an average displacement height computer, a displacement logic network and a plurality of summing members. For example, in FIG. 2 an average displacement height computer 90 has an input side connected to each means for measuring displacement. In particular, average displacement height computer 90 has an input side connected electrically by line 30 to each displacement transducer 66. A displacement logic network 92 is also provided having an input side electrically connected through line 36 to means 34 which controls the displacement logic network 92 by means of a displacement program. As noted above, means 34 can be, for example, a keyboard, disc, tape, EPROM, and the like. A plurality of summing members 94 is also provided each of which has an input side electrically connected to the average displacement height computer 90 and the displacement logic network 92 through lines 96 and 98, respectively, and an output side electrically connected to a respective summing means 58 through a respective line 28. It will be apparent from the foregoing that each actuator member 8 will have a summing member 58 which is electrically connected to a separate summing member 94 of the microprocessor based control system 26 by a respective line 28 extending therebetween. Similarly, each summing member 94 will be electrically connected to the average displacement height computer 90 and the displacement logic network 92 by respective lines 96 and 98 extending therebetween.

In the preferred embodiment of FIG. 2, the means connected to the actuator member 8 for providing a body contact pressure command signal thereto is in the form of means electrically connected by a respective line 32 to a respective summing means 46 for providing a body contact pressure command signal to each summing means 46. Such means for providing a body contact pressure command signal includes a body contact pressure logic network 100 having an output side electrically connected by line 32 to each summing means 46 and an input side electrically connected by line 40 by means 38 which controls the body contact pressure logic network by means of a body contact pressure program. As noted above, means 38 can be, for example, a keyboard, disc, tape, EPROM, and the like. It will be apparent from the foregoing that each actuator member 8 will have a summing member 46 which is electrically connected to the body contact pressure logic network at the microprocessor based control system 26 by a respective line 32 extending therebetween.

As depicted in FIG. 1, a single microprocessor 26 as described herein is provided to control a plurality of actuator members 8. A plurality of lines 28 is provided, each line 28 extending from one of a plurality of summing members 94 to a summing member 58 of one of the actuator members 8. A plurality of lines 30 is also provided, each line 30 extending from the computer 90 to a displacement transducer 66 of one of the actuator members 8. In addition, a plurality of lines 32 is provided, each line 32 extending from the logic network 100 to a summing member 46 of one of the actuator members 8. The command signals on lines 28 and 32 are converted from digital to analog signals in a known manner by means of a digital to analog converter 102 contained in the microprocessor based control system 26. The signals on line 30 are converted from analog to digital signals in a known manner by means of an analog to digital converter 104 contained in the microprocessor based control system 26.

In the embodiment of FIG. 2, a position bias set point means is connected to the summing means 58 for each actuator member 8. In particular, a position bias set point potentiometer 106 is electrically connected by line 108 to the summing means 58. Each position bias set point means allows for position bias set point adjustment to set each actuator to a predetermined displacement as required by the patient and features of the patient's anatomy. Alternatively, this position bias set point can be provided by the microprocessor instead of the potentiometer shown.

Figure 3:
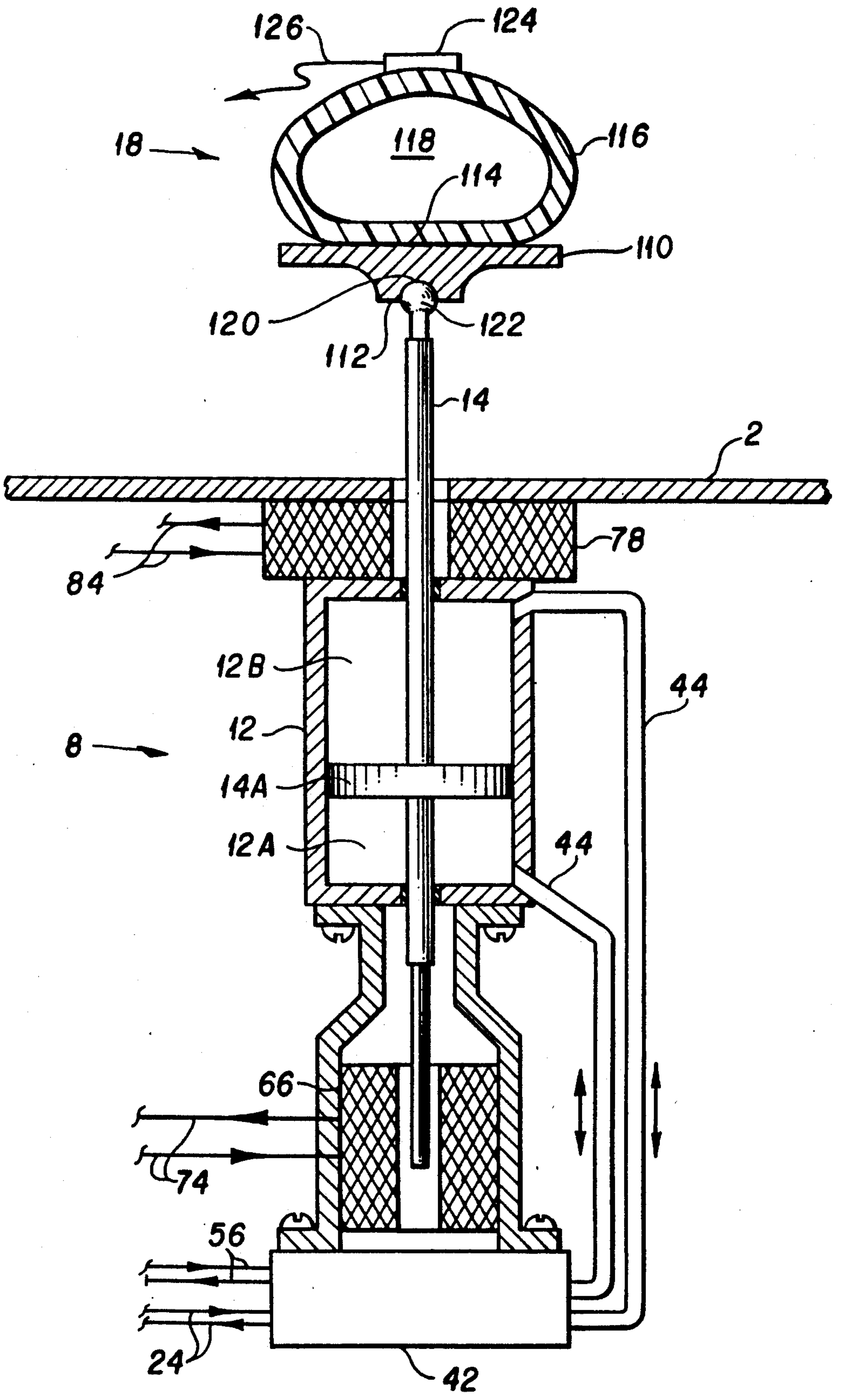
FIG. 3 is a view of one embodiment of one actuator member of the embodiment of FIG. 1.

FIG. 3 depicts an actuator member 8 which includes an actuator comprising the actuator cylinder 12 and actuator rod 14 including an enlarged operating piston 14A. In this embodiment, the support pad 18 is connected to the distal end of rod 14 by means of a base member 110, one surface 112 of which is pivotally fastened to the distal end and an opposite surface 114 of which is fastened to a conformable supporting member 116. The member 116 can be fastened to surface 114 by, for example, an adhesive or mechanical fastener, and can be in the form of an elastomer or plastic cell, balloon, shell, and the like. Member 116 can be filled at 118 with a foam or other pad-like material, air, gel, or other conformal material. In other examples, the member 116 can be, without limitation, a solid compliant pad formed from foam, elastomer, felt and the like. All of such embodiments will provide low resistance to side force by deforming and thus reduce shear forces on body tissue. In the preferred embodiment surface 112 includes means connected to the distal end of actuator rod 14 for providing two-degrees of freedom of movement of the supporting member 116 relative to the actuator rod 14. For example, as depicted in FIG. 3, surface 112 includes a socket 129 which mates with a ball 122 at the distal end of actuator rod 14 to provide a ball and socket connection allowing a rotational degree of freedom of movement of the supporting member 116 around the ball and socket. Alternatively, such a rotational degree of movement can be provided by other means, such as, for example, an orthogonal flexure or spring that can deflect to provide alignment of the support pad normal to the anatomy of the patient.

Each actuator member 8 of the type depicted in FIG. 3 is mounted to a bed frame or chair frame or similar base 2 through the force transducer or load cell 78. An electrical output proportional to the force a body portion exerts on supporting member 116 is provided at line 84 which is electrically connected to the scaling amplifier 80 of FIG. 2. A displacement transducer 66 such as a linear potentiometer or LVDT is coupled to the actuator 12, 14 in a known manner to measure the position of the actuator arm 14 and in turn the supporting member 116 in contact with the body of a patient. An electrical output proportional to displacement of actuator rod 14 is provided at line 74 which is electrically connected to a conditioning amplifier 72 for providing a position feedback ratio and the average displacement height computer 90 of FIG. 2. As noted, the mechanical flotation system of the present invention comprises a plurality of actuator members 8 arranged in a nested array throughout the area of the support surface of the bed or chair or similar base 2. Nesting is tight so that the spaces between support pads 18 are small relative to the size of the support pads thereby providing continuous and smooth support of the patient. The power source 22 of FIG. 2 is connected pneumatically at line 24 to the servovalve 42 shown in FIG. 3. For purposes of illustration such power source is any known pneumatic power source which supplies air to the servovalve 42 through lines 24 in a known manner. In turn, in response to control signals received at line 56 the servovalve 42 selectively supplies air to chamber 12A or 12B of actuator cylinder 12 to cause the enlarged operating piston 14A and therefore the actuating rod 14 extending therefrom to reciprocate within the actuator cylinder 12 as required. Generally, the actuator includes a spring return, now shown, to a downward position away from the body being supported by support pads 18.

If desired, the support pad 18 can include means for measuring body characteristics, and such measurements can be used in the servo control of the mechanical flotation system. For example, FIG. 3 depicts a temperature sensor 124 such as a thermistor, resistance thermometer, thermocouple or other device at the surface of the support pad 18. Measurements of temperature can be represented by electrical signals conveyed at line 126 which can be connected to another summing member (not shown) which receives temperature related command signals from the microprocessor based control system 26 to effect control signals through line 56 depending upon the program selected.

The operation of the active mechanical flotation system of the present invention is now described with reference to FIGS. 1 to 3. Each actuator member 8 of a plurality of actuator members 8 includes an actuator and transducers, and a servo control and measuring means associated therewith as described herein. There is a plurality of such actuator members 8 repeated n times. Each actuator member 8 includes a support pad 18, the support pads 18 collectively providing a support surface for a body 20 as illustrated in FIGS. 1 and 1A.

It will be apparent that the system depicted in FIG. 2 includes two feedback control servo loops that interact to measure force and displacement at each actuator member 8 and to integrate such information to provide a control signal at line 56 to position the patient as desired at each contact pad through the action of a servovalve 42. One servo control loop controls the contact pressure between a support pad and the tissue of the body of a patient bearing against the support pad. The other servo control loop controls the floating position of the actuator rod which in turn establishes the height of the patient. In the preferred embodiment it is desirable to provide that the contact pressure feedback control loop be the primary control loop and have the higher loop gain of the two feedback control servo loops in other to provide the desired control of tissue pressure on the body. The ratio of the loop gains of the pressure and displacement or position feedback loops is a measure of the stiffness or spring rate of the actuator systems. That is, when the active actuators 12, 14 are loaded by the application of an external force upon the support pads, a displacement of each actuator will take place that is proportional to the force in a manner similar to that of a spring whose spring rate is equal to the ratio of change in force divided by the change in deflection. The spring rate can be set by controlling or selecting the gains of the servo loops and their ratios. The position control amplifier 60 amplifies an error signal which is developed at the summer 58. This error signal results from subtracting the actuator rod displacement or position signal provided by the displacement transducer from the set point or command signal provided by the microprocessor based control system 26. Also, a bias signal is provided by the potentiometer 106 and is added to the set point command signal to allow establishing an initial position of the actuator. A position feedback or displacement signal of an actuator rod is measured by the displacement transducer 66 and is equal to the deflection and vertical movement of the reclining body at that point. This physical characteristic of the body can be thought of as a spring with a value of tissue spring rate. The electrical signal from the displacement transducer 66 is connected to the average height computer 90 in the microprocessor based control system 26 and is amplified by the position feedback ratio amplifier 72 to establish the feedback gain of the position servo loop. The amplified position error signal is connected to the power amplifier 50 that provides the driving current through line 56 to the servovalve 42. An air supply 22 is connected to the pneumatic servovalve shown as well as all other servovalves in the system. A modulated air supply from the servovalve is connected to the actuator 12, 14. The actuator 12, 14 can be operated either in a double acting fashion or single acting fashion with a spring return. Stroking of the actuator produces the displacement of the actuator rod, support pad and body contact point. A force transducer 78 measures the force present at line 68 produced at the body contact point. Dividing the body contact force by the area of contact between the support pad and body tissue results in the value of body contact or tissue interface pressure present at line 86 produced at the corresponding location on the patient. By applying an operational amplifier 82 for providing a contact pressure feedback ratio to the body contact pressure signal present at line 86, the feedback gain of the pressure feedback servo loop is established. The pressure feedback signal from amplifier 60 and the pressure set point command signal from the microprocessor at line 32. Then under the command of body contact pressure and displacement signals, both of these parameters are interactively controlled at the location of the contact pad on the patient to desired values.

The single microprocessor based logic and control network 26 connects to and controls all actuator members 8. Contained within this control system is the average displacement height computer 90 that adds all of the measured actuator positions present at lines 30 and then divides the sum by the number of actuators in the system. This results in a signal that represents an average height. It is desired that this average height be well within the travel limits of the actuators. This average height signal is added to the signal developed by the displacement logic network 92. The displacement logic network generates a set point command signal in response to instructions that are provided by the displacement program inputs at 34 by way of keyboard, disc, tape, EPROM or other source. Instructions such as momentary retract and reapplication of contact to relieve built in tissue stress can be applied along with selected time function cycles to produce message or shear relief. This command signal is added to the average height command produced by the average displacement height computer 90 at the summing member 94 resulting in the displacement command at line 28. The average height information from computer 90 is added to each actuator command from 1 to n as shown by the summing member 94n for channel n. Program commands can be established for individual or groups of actuators to perform sequential operations. Body contact pressure command signals represented at lines 32 are produced by the body contact pressure logic network 100. Instructions are provided through body contact pressure program inputs at 38 using the same programming methods as employed for displacement program inputs. Actuators can be programmed to produce desired levels of contact pressure at each individual support pad or in groups. For example, each row of support pads, from head to foot, can have its pressure raised or lowered and sequentially repeated in the adjacent row to produce a wave of pressure or message. A group of pads under a bony prominence can relieve tissue pressure to zero by retracting momentarily. Or, a group of pads can be set to a lower interface pressure value than used in surrounding areas to treat affected tissue. Also, percussion can be programmed for select parts of the back of the patient to treat upper respiratory conditions.

Values of tissue stiffness can be measured along with body contour by momentarily displacing each actuator by a known small amount and measuring the corresponding change in contact pressure or normal force which is equal to contact pressure divided by the contact area. Tissue stiffness is equal to the ratio of change in normal force to change of displacement. Such values can be valuable in diagnosis, setting up treatments and establishing criteria for treatments dealing with tissue trauma.

A further extension to this system is to provide adaptive control through the integration of additional measured or predetermined information. This could include, but not be limited to, measuring body surface temperature at each contact site. Surface temperature information can be obtained by embedding a temperature sensor such as a thermistor, resistance thermometer, thermocouple or other device at the surface of each support pad. Temperature changes resulting from variations in blood flow near the surface of tissue can be used to modify contact pressures in local areas and provide adaptive control for treatment. Other sensors such as moisture, Ph, shear force, chemical and gas can be mounted at the surface of the support pads to provide information about the patient's physical condition and aspects of possible adaptive control.

Total weight of the patient can be determined by summing all of the values of force produced by each load cell.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A mechanical flotation system to support a body including a plurality of support pads which contact various portions of said body and are displaced to selectively raise and lower portions of the body in response to displacement control signals and body contact pressure control signals, comprising:

a plurality of actuator members, each actuator member of said plurality of actuator members comprising;

an actuator connected to a support pad of said plurality of support pads;

means connected to said actuator for controlling displacement of said support pad relative to said body to produce desired levels of contact pressure at said support pads in response to a displacement control signal and a body contact pressure control signal;

a first summing means connected to said controlling means for providing said displacement control signal to said controlling means, and a second summing means connected to said controlling means for providing said body contact pressure control signal to said controlling means;

means connected between said actuator and said first summing means for measuring displacement of said actuator and providing a signal representative of said displacement to said first summing means; and means connected between said actuator and said second summing means for measuring body contact pressure at said support pad and providing a signal representative of said body contact pressure to said second summing means;

means connected to said controlling means for displacing said actuator and said support pad relative to said body;

means connected to said first summing means for providing an actuator displacement command signal to said first summing means; and means connected to said second summing means for providing a body contact pressure command signal to said second summing means.

2. The mechanical flotation system of claim 1 wherein said means for measuring displacement includes a displacement transducer.

3. The mechanical flotation system of claim 1 wherein said means for measuring body contact pressure includes a force transducer.

4. The mechanical flotation system of claim 1 wherein said second summing means is connected to said controlling means through an actuator control amplifier and then a power amplifier.

5. The mechanical flotation system of claim 4 wherein said first summing means is connected to said controlling means through a position control amplifier, then said second summing means, then said actuator control amplifier and then said power amplifier.

6. The mechanical flotation system of claim 1 further including a position bias set point means connected to said first summing means.

7. The mechanical flotation system of claim 5 further including a position bias set point means connected to said first summing means.

8. The mechanical flotation system of claim 2 wherein said displacement transducer is connected to said first summing means through a feedback ratio amplifier, and further wherein said displacement transducer is connected to said means for providing an actual displacement command signal.

9. The mechanical flotation system of claim 3 wherein said force transducer is connected to said second summing means through a conditioning amplifier for providing a contact pressure feedback ratio.

10. The mechanical flotation system of claim 1 wherein said means for providing an actuator displacement command signal includes:

an average displacement height computer having an input side connected through an analog to digital converter to each means for measuring displacement;

a displacement logic network having an input side connected to a displacement program; and a plurality of summing members, each summing member of said plurality of summing members having an input side connected to said average displacement height computer and said displacement logic network, and an output side connected to a respective first summing means.

11. The mechanical flotation system of claim 1 wherein said means for providing a body contact pressure command signal includes a body contact pressure logic network having an output side connected through a digital to analog converter to each second summing means and an input side connected to a body contact pressure program.

12. The mechanical flotation system of claim 1 wherein said controlling means includes a servovalve connected to an input side of said actuator, and further wherein said displacing means includes a fluid supply means connected to an input side of each servovalve.

13. The mechanical flotation system of claim 1 wherein said actuator includes an actuator cylinder and an actuator rod mounted thereto for displacement relative thereto, said support pad being connected to a distal end of said actuator rod.

14. The mechanical flotation system of claim 13 wherein said support pad is connected to said distal end by means of a base member, one surface of which is pivotally fastened to said distal end and an opposite surface of which is fastened to said support pad.

15. The mechanical flotation system of claim 14 wherein said one surface includes means connected to said distal end for providing two-degrees of freedom of movement of said support pad relative to said actuator rod.

16. The mechanical flotation system of claim 15 wherein said support pad is conformable to said portion of said body.

17. The mechanical flotation system of claim 16 wherein said means for providing an actuator displacement command signal includes:

an average displacement height computer having an input side connected through an analog to digital converter to each means for measuring displacement;

a displacement logic network having an input side connected to a displacement program; and a plurality of summing members, each summing member of said plurality of summing members having an input side connected to said average displacement height computer and said displacement logic network, and an output side connected to a respective first summing means.

18. The mechanical flotation system of claim 17 wherein said means for providing a body contact pressure command signal includes a body contact pressure logic network having an output side connected through a digital to analog converter to each second summing means and an input side connected to a body contact pressure program.

19. The mechanical flotation system of claim 18 wherein said controlling means includes a servovalve connected to an input side of said actuator, and further wherein said displacing means includes a fluid supply means connected to an input side of each servovalve.

20. The mechanical flotation system of claim 19 wherein said means for measuring displacement includes a displacement transducer, said means for measuring body contact pressure includes a force transducer, and further including a position bias set point potentiometer connected to said first summing means.

21. The mechanical flotation system of claim 1 wherein said support pad includes means connected thereto for measuring one or more body characteristic where said body engages said support pad.

22. The mechanical flotation system of claim 22 wherein said measuring means is connected to said system for use in providing control signals to said controlling means.

* * * * *